United States Patent
Xue et al.

(10) Patent No.: US 12,418,058 B2
(45) Date of Patent: Sep. 16, 2025

(54) BATTERY PACK TEMPERATURE ACQUISITION MODULE AND SYSTEM

(71) Applicant: Tyco Electronics (Shanghai) Co. Ltd., Shanghai (CN)

(72) Inventors: Bingjing (Crystal) Xue, Shanghai (CN); Xiao (Nichee) Zhou, Shanghai (CN); Ziwei (Vivi) Li, Shanghai (CN); Xiaoguang (Field) Sun, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 813 days.

(21) Appl. No.: 17/705,463

(22) Filed: Mar. 28, 2022

(65) Prior Publication Data
US 2022/0320616 A1 Oct. 6, 2022

(30) Foreign Application Priority Data
Apr. 2, 2021 (CN) .......................... 202120682028.3

(51) Int. Cl.
*H01M 10/48* (2006.01)
*H01M 10/655* (2014.01)
(Continued)

(52) U.S. Cl.
CPC ....... *H01M 10/486* (2013.01); *H01M 10/655* (2015.04); *H01M 50/505* (2021.01); *H01M 50/547* (2021.01)

(58) Field of Classification Search
CPC ............ H01M 10/486; H01M 10/655; H01M 50/547; H01M 50/505; G01K 1/14
See application file for complete search history.

(56) References Cited

U.S. PATENT DOCUMENTS

| 4,325,600 A | 4/1982 | Nestor |
| 2013/0045401 A1* | 2/2013 | Yoon .................... H01M 50/211 429/153 |

(Continued)

FOREIGN PATENT DOCUMENTS

| CN | 103715381 A | 4/2014 |
| CN | 104048776 A | 9/2014 |

(Continued)

OTHER PUBLICATIONS

Translation of JP2013-140019A.*
(Continued)

*Primary Examiner* — Mirellys Jagan
(74) *Attorney, Agent, or Firm* — Potomac Law Group, PLLC

(57) ABSTRACT

The present invention provides a battery pack temperature acquisition module and system. The battery pack temperature acquisition module has: an insulation body; a temperature sensing element mounted on the insulation body and configured to detect a temperature of a battery cell; and a connection terminal mounted on the insulation body. The temperature sensing element has a lead for transmitting a temperature signal, one end of the connection terminal is electrically connected with the lead of the temperature sensing element, and the other end is adapted to be connected to a signal acquisition line to electrically connect the temperature sensing element to the signal acquisition line, the connection terminal and the insulation body are respectively formed. In the present invention, the battery pack temperature acquisition module can be replaced separately without replacing the signal acquisition line, which improves the convenience of use and reduces the later maintenance cost.

18 Claims, 13 Drawing Sheets

(51) Int. Cl.
*H01M 50/505* (2021.01)
*H01M 50/547* (2021.01)

(56) References Cited

U.S. PATENT DOCUMENTS

| | | |
|---|---|---|
| 2013/0059487 A1 | 3/2013 | Sulek et al. |
| 2016/0081622 A1 | 3/2016 | Abreu |
| 2019/0113392 A1 | 4/2019 | Matsumura et al. |

FOREIGN PATENT DOCUMENTS

| | | |
|---|---|---|
| CN | 102496750 B | 10/2014 |
| CN | 106098310 A | 11/2016 |
| CN | 107221722 A | 9/2017 |
| CN | 109613310 B | 4/2019 |
| CN | 211879491 U | 11/2020 |
| EP | 1037028 A1 | 9/2000 |
| EP | 3113287 A1 | 1/2017 |
| JP | 2013140019 A | 7/2013 |
| JP | 2014089912 A | 5/2014 |
| JP | 2018179938 A | 11/2018 |
| KR | 101386167 B1 * | 4/2014 |
| WO | 2007137878 A1 | 12/2007 |
| WO | WO-2011132570 A1 * | 10/2011 ............... G01K 7/22 |
| WO | 2021002635 A1 | 1/2021 |

OTHER PUBLICATIONS

Extended Search Report for GB Application No. GB2204622.1 dated Sep. 29, 2022.
Office Action for Great Britain Patent Application No. GB2204622.1 iissued on Jul. 14, 2023.
French Search Report for French Application No. FR2202880, dated Mar. 23, 2023.

\* cited by examiner

BATTERY PACK TEMPERATURE ACQUISITION MODULE AND SYSTEM

CROSS-REFERENCE TO RELATED APPLICATION

This application claims the benefit of Chinese Patent Application No. 202120682028.3 filed on Apr. 2, 2021 in the State Intellectual Property Office of China, the whole disclosure of which is incorporated herein by reference.

BACKGROUND OF THE INVENTION

Field of the Invention

The present invention relates to a battery pack temperature acquisition module and a battery pack temperature acquisition system comprising the battery pack temperature acquisition module.

Description of the Related Art

Battery pack is the most important part of electric vehicle. In the prior art, in order to ensure the service life of the battery pack, the temperature and voltage of the battery pack must be collected and controlled to ensure that the temperature and voltage of the battery pack remain stable.

In the prior art, the signal acquisition device for collecting the temperature and voltage of the battery pack usually includes a flexible printed circuit board (FPC) and a fuse and temperature sensor welded on the flexible printed circuit board. The disadvantage of the existing signal acquisition device is that the fuse, temperature sensor and other devices cannot be replaced separately. During maintenance, the whole flexible printed circuit board must be replaced. The maintenance cost is very high and the use is very inconvenient.

In addition, in the prior art, components such as fuses and temperature sensors are welded to the flexible printed circuit board by means of reflow welding, tin welding, ultrasonic welding or laser welding. Therefore, the flexible printed circuit board must be covered with a high-temperature resistant protective film to prevent the high temperature generated during welding from adversely affecting the flexible printed circuit board, which greatly increases the manufacturing cost.

SUMMARY OF THE INVENTION

The present invention has been made to overcome or alleviate at least one aspect of the above mentioned disadvantages.

According to an aspect of the present invention, there is provided a battery pack temperature acquisition module, comprising: an insulation body; a temperature sensing element mounted on the insulation body and configured to detect a temperature of a battery cell; and a connection terminal mounted on the insulation body, the temperature sensing element comprises a lead for transmitting a temperature signal, one end of the connection terminal is electrically connected with the lead of the temperature sensing element, and the other end is adapted to be connected to a signal acquisition line to electrically connect the temperature sensing element to the signal acquisition line, the connection terminal and the insulation body are respectively formed.

According to an exemplary embodiment of the present invention, a plurality of clamping blocks are provided on the insulation body, and the clamping blocks protrude from the surface of the insulation body for fixing the temperature sensing element and the connection terminal respectively.

According to another exemplary embodiment of the present invention, the connection terminal comprises a main body, the main body has opposite first and second ends, the first end of the main body is used to connect to the signal acquisition line, and the second end of the main body is electrically connected with the lead of the temperature sensing element.

According to another exemplary embodiment of the present invention, a plurality of wing parts are respectively formed on both sides of the first end of the main body, and the wing part is toothed and adapted to be crimped on the signal acquisition line by puncture crimping.

According to another exemplary embodiment of the present invention, a welding part is formed at the second end of the main body, and the lead of the temperature sensing element is welded to the welding part.

According to another exemplary embodiment of the present invention, a clamping part is formed at the second end of the main body, the clamping part is used to pre clamp and fix the lead of the temperature sensing element before welding the lead.

According to another exemplary embodiment of the present invention, a clamping portion is formed at the second end of the main body, the clamping portion is interference matched with the lead of the temperature sensing element to realize electrical contact and fixed connection between them.

According to another exemplary embodiment of the present invention, the temperature sensing element comprises a pair of leads electrically contacting and fixedly connected with a pair of connection terminals respectively; the first end of each of the pair of connection terminals is provided with a connection part electrically connected with the signal acquisition line; the connection parts of the pair of connection terminals are staggered by a predetermined distance in an extension direction of the main body, so that the connection parts of the pair of connection terminals are staggered from each other after being connected to the signal acquisition line.

According to another exemplary embodiment of the present invention, the battery pack temperature acquisition module further comprises a heat conduction plate adapted to be welded on a bus bar of a battery pack, the temperature sensing element is in thermal contact or thermal connection with the heat conduction plate to detect the temperature of the battery cell through the heat conduction plate.

According to another exemplary embodiment of the present invention, the heat conduction plate is provided in contact with the temperature sensing element.

According to another exemplary embodiment of the present invention, an area of the heat conduction plate to contact the temperature sensing element is a concave area.

According to another exemplary embodiment of the present invention, the insulation body is in a plate shape, and the heat conduction plate is spliced and connected with the insulation body.

According to another exemplary embodiment of the present invention, a welding surface of the heat conduction plate and a back surface of the insulation body are coplanar to reduce the thickness of the battery pack temperature acquisition module.

According to another exemplary embodiment of the present invention, the battery pack temperature acquisition module further comprises an insulation package formed on the insulation body, the temperature sensing element is encapsulated in the insulation package.

According to another exemplary embodiment of the present invention, an electrical connection part between the connection terminal and the lead is encapsulated in the insulation package.

According to another exemplary embodiment of the present invention, the insulation package is a low pressure injection molded part.

According to another exemplary embodiment of the present invention, the insulation body is in a box shape, and the temperature sensing element is accommodated and encapsulated in the box shaped insulation body.

According to another exemplary embodiment of the present invention, a thermal conductive package is provided in the box shaped insulation body, and the temperature sensing element is encapsulated in the box shaped insulation body by the thermal conductive package.

According to another aspect of the present invention, there is provided a battery pack temperature acquisition system comprising: a bracket; the above battery pack temperature acquisition module; and a signal acquisition line. The battery pack temperature acquisition module and the signal acquisition line are fixedly supported on the bracket; the connection terminal of the battery pack temperature acquisition module is connected to the signal acquisition line to electrically connect the temperature sensing element of the battery pack temperature acquisition module to the signal acquisition line.

According to an exemplary embodiment of the present invention, the battery pack temperature acquisition system further comprises a bus bar fixedly supported on the bracket and connected with a battery cell, the battery pack temperature acquisition module is configured to sense the temperature of the bus bar and transmit a temperature signal to the signal acquisition line.

According to another exemplary embodiment of the present invention, the bracket is formed with an installation opening, the battery pack temperature acquisition module is installed in the installation opening, and the temperature sensing element is in thermal contact or thermal connection with a battery cell.

In the above exemplary embodiments according to the present invention, the battery pack temperature acquisition module is electrically connected to the signal acquisition line by the connection terminal. Therefore, the battery pack temperature acquisition module can be replaced separately without replacing the signal acquisition line, which improves the convenience of use and reduces the later maintenance cost.

In addition, in the above exemplary embodiments of the present invention, the battery pack temperature acquisition module is electrically connected to the signal acquisition line by terminal crimping instead of tin welding, ultrasonic welding or laser welding. Therefore, the signal acquisition line does not need to be resistant to high temperature, which reduces the production cost.

BRIEF DESCRIPTION OF THE DRAWINGS

The above and other features of the present invention will become more apparent by describing in detail exemplary embodiments thereof with reference to the accompanying drawings, in which:

FIG. 7b shows an illustrative perspective view of a bracket shown in FIG. 7a;

FIG. 8 shows an illustrative perspective view of a battery pack temperature acquisition module in the battery pack temperature acquisition system shown in FIG. 7a;

DETAILED DESCRIPTION OF PREFERRED EMBODIMENTS

Figure 1:
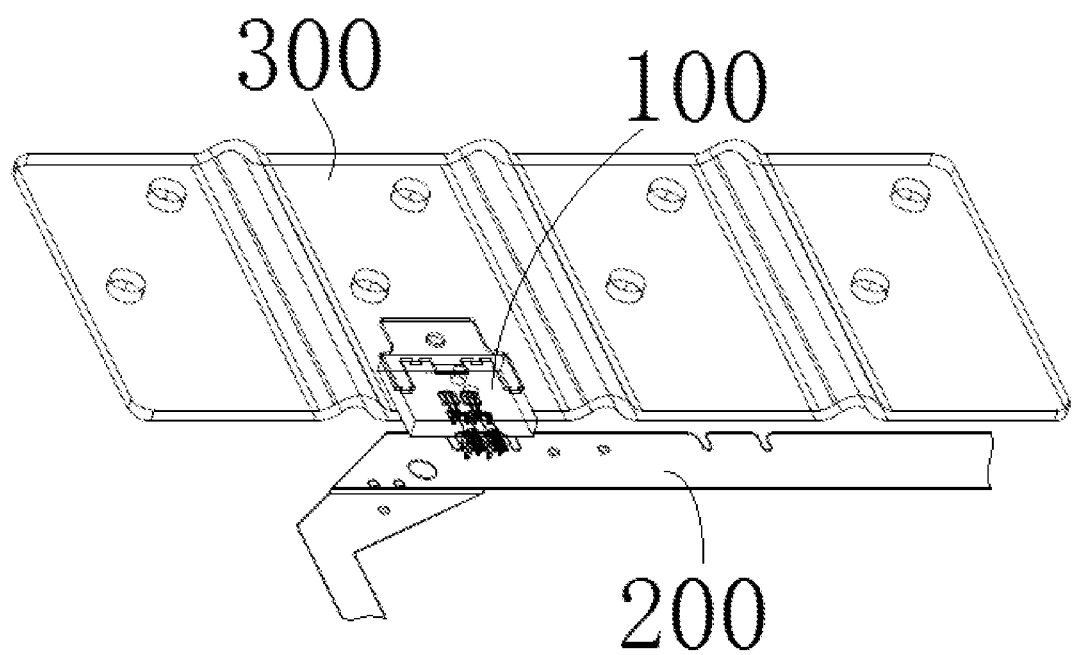
FIG. 1 shows an illustrative view of a battery pack temperature acquisition system according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a battery pack temperature acquisition module, comprising: an insulation body; a temperature sensing element mounted on the insulation body and configured to detect a temperature of a battery cell; and a connection terminal mounted on the insulation body, the temperature sensing element comprises a lead for transmitting a temperature signal, one end of the connection terminal is electrically connected with the lead of the temperature sensing element, and the other end is adapted to be connected to a signal acquisition line to electrically connect the temperature sensing element to the signal acquisition line, the connection terminal and the insulation body are respectively formed.

According to another general concept of the present invention, there is provided a battery pack temperature acquisition system comprising: a bracket; the above battery pack temperature acquisition module; and a signal acquisition line. The battery pack temperature acquisition module and the signal acquisition line are fixedly supported on the bracket; the connection terminal of the battery pack temperature acquisition module is connected to the signal acquisition line to electrically connect the temperature sensing element of the battery pack temperature acquisition module to the signal acquisition line.

FIG. 1 shows an illustrative view of a battery pack temperature acquisition system according to an exemplary embodiment of the present invention.

As shown in FIG. 1, in an embodiment, the battery pack temperature acquisition system mainly includes a plurality of battery pack temperature acquisition modules 100 and a signal acquisition line 200. The plurality of battery pack temperature acquisition modules 100 are used to detect the temperature of the battery pack respectively, and the plurality of battery pack temperature acquisition modules 100 are electrically connected to the signal acquisition line 200 respectively, so that the temperature signals detected by the battery pack temperature acquisition modules 100 can be collected through the signal acquisition line 200.

Figure 2:
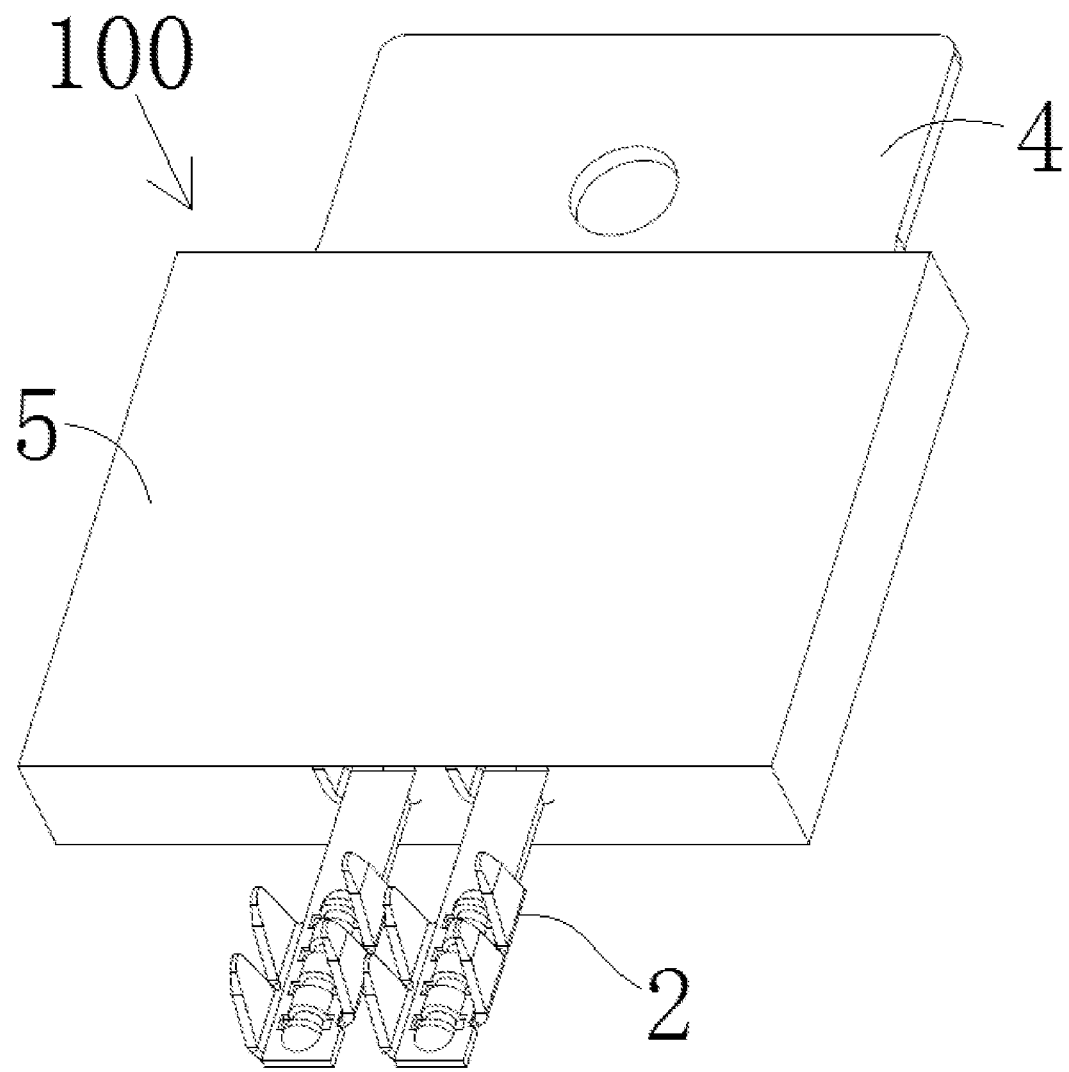
FIG. 2 shows an illustrative perspective view of a battery pack temperature acquisition module in the battery pack temperature acquisition system shown in FIG. 1.
Figure 3:
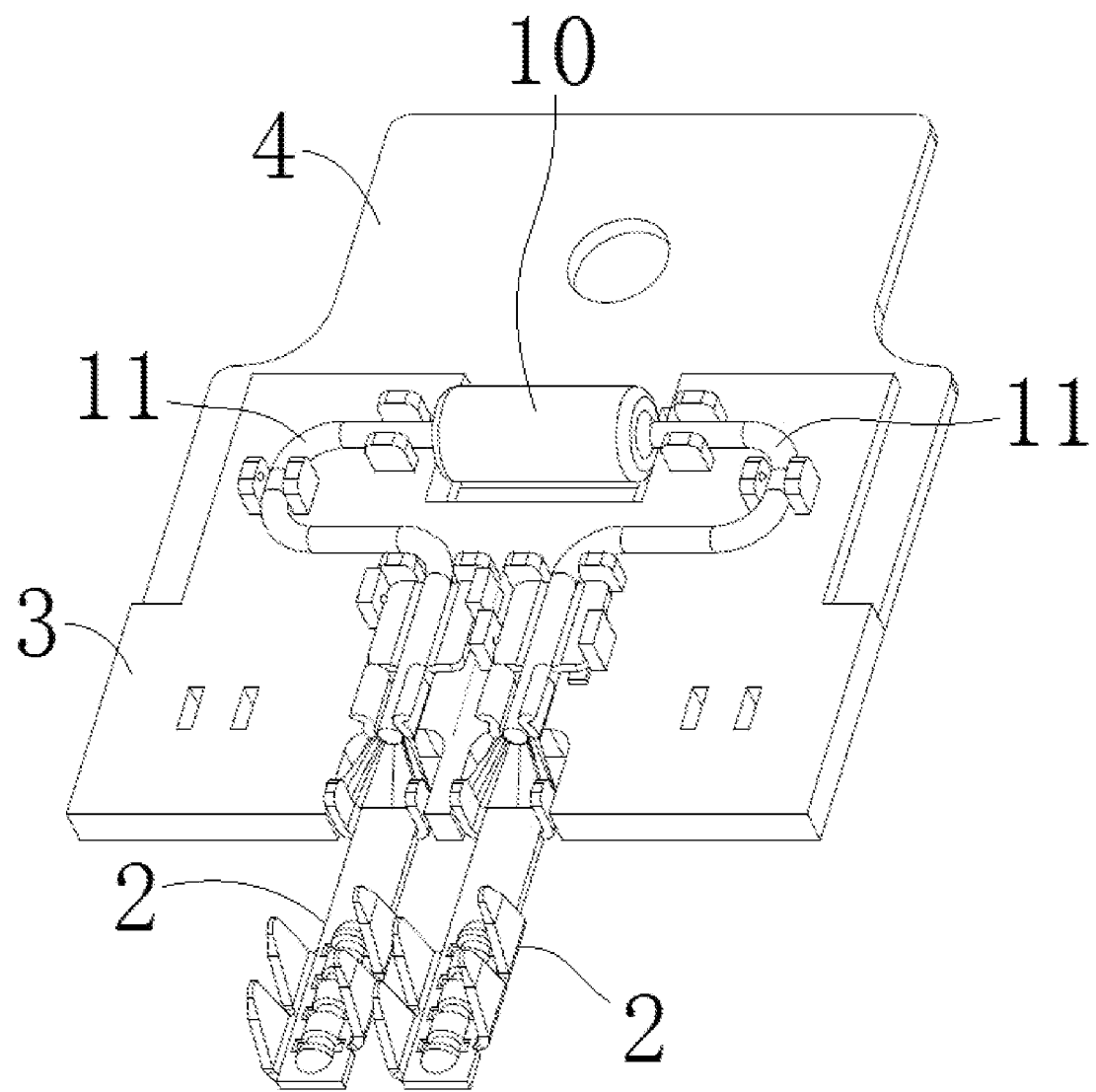
FIG. 3 shows an illustrative perspective view of the battery pack temperature acquisition module shown in FIG. 2, in which the insulation package is removed.

FIG. 2 shows an illustrative perspective view of a battery pack temperature acquisition module 100 in the battery pack temperature acquisition system shown in FIG. 1. FIG. 3 shows an illustrative perspective view of the battery pack temperature acquisition module 100 shown in FIG. 2, in which the insulation package 5 is removed.

As shown in FIGS. 1 to 3, in an embodiment, the battery pack temperature acquisition module 100 mainly includes an insulation body 3, a temperature sensing element 10 and two connection terminals 2. The temperature sensing element 10 is mounted on the insulation body 3 for detecting the temperature of a battery cell of the battery pack. The two connection terminals 2 are electrically connected to two leads 11 of the temperature sensing element 10 respectively.

As shown in FIGS. 1 to 3, in an embodiment, a plurality of clamping blocks are formed on the insulation body 3, and the plurality of clamping blocks protrudes from the surface of the insulation body 3 for fixing and installing the temperature sensing element 10 and the connection terminal 2 respectively.

Figure 6:
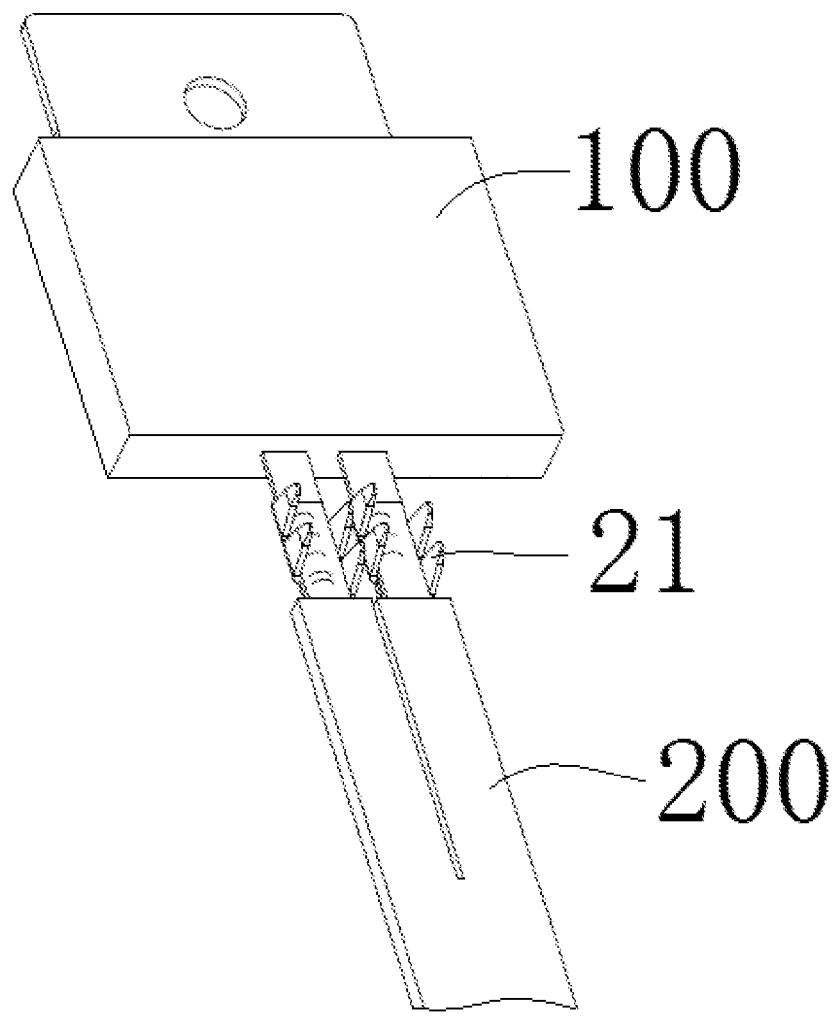
FIG. 6 shows an illustrative view of a connection terminal of the battery pack temperature acquisition module shown in FIG. 2 crimped to a signal acquisition line.

FIG. 6 shows an illustrative view of a connection terminal 2 of the battery pack temperature acquisition module 100 shown in FIG. 2 crimped to the signal acquisition line 200.

As shown in FIGS. 1-3 and 6, in an embodiment, the connection terminal 2 of the battery pack temperature acquisition module 100 is adapted to be crimped to the signal acquisition line 200 to electrically connect the temperature sensing element 10 of the battery pack temperature acquisition module 100 to the signal acquisition line 200. In the present invention, the battery pack temperature acquisition module 100 is electrically connected to the signal acquisition line 200 by terminal crimping. Therefore, the battery pack temperature acquisition module 100 can be replaced separately without replacing the signal acquisition line 200, which improves the convenience of use and reduces the later maintenance cost. In addition, in the present invention, the battery pack temperature acquisition module 100 is electrically connected to the signal acquisition line 200 by terminal crimping instead of tin welding, ultrasonic welding or laser welding. Therefore, the signal acquisition line 200 does not need to be resistant to high temperature, which reduces the production cost.

As shown in FIGS. 1 to 3, in an embodiment, the battery pack temperature acquisition module 100 also includes a heat conduction plate 4 adapted to be welded on a bus bar 300 of the battery pack. The temperature sensing element 10 is in thermal contact or thermal connection with the heat conduction plate 4 to detect the temperature of the bus bar 300 through the heat conduction plate 4, so that the temperature of the battery pack can be detected.

Figure 4:
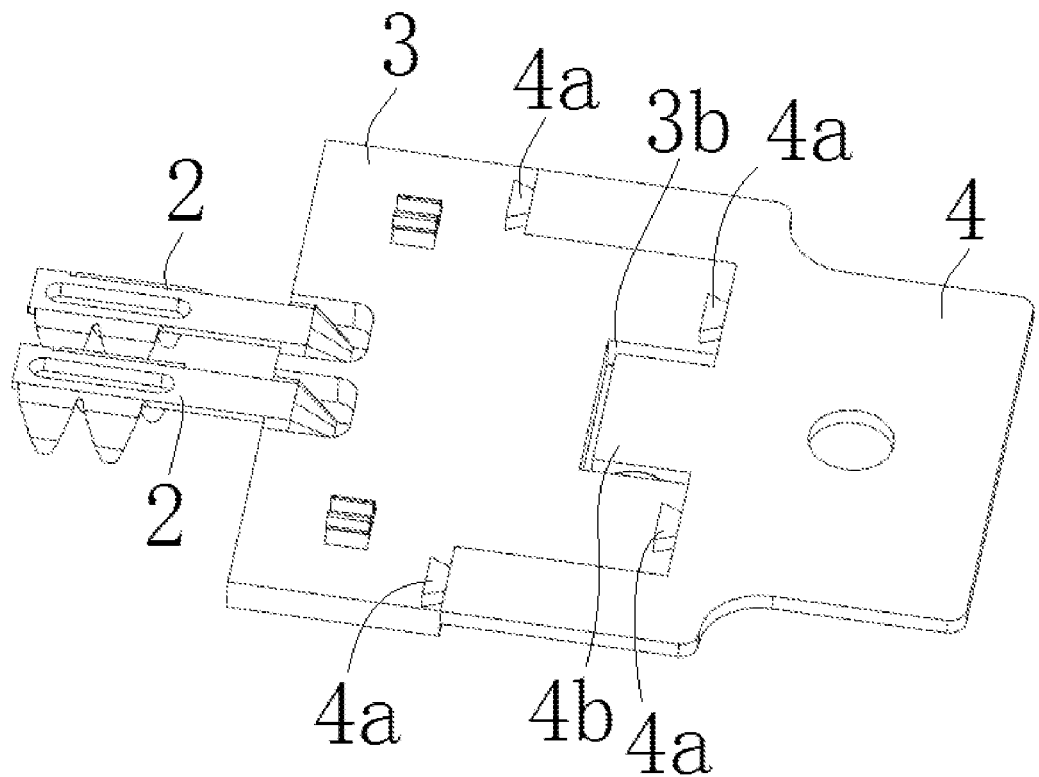
FIG. 4 shows an illustrative perspective view of the battery pack temperature acquisition module shown in FIG. 3 when viewed from the bottom.
Figure 4A:
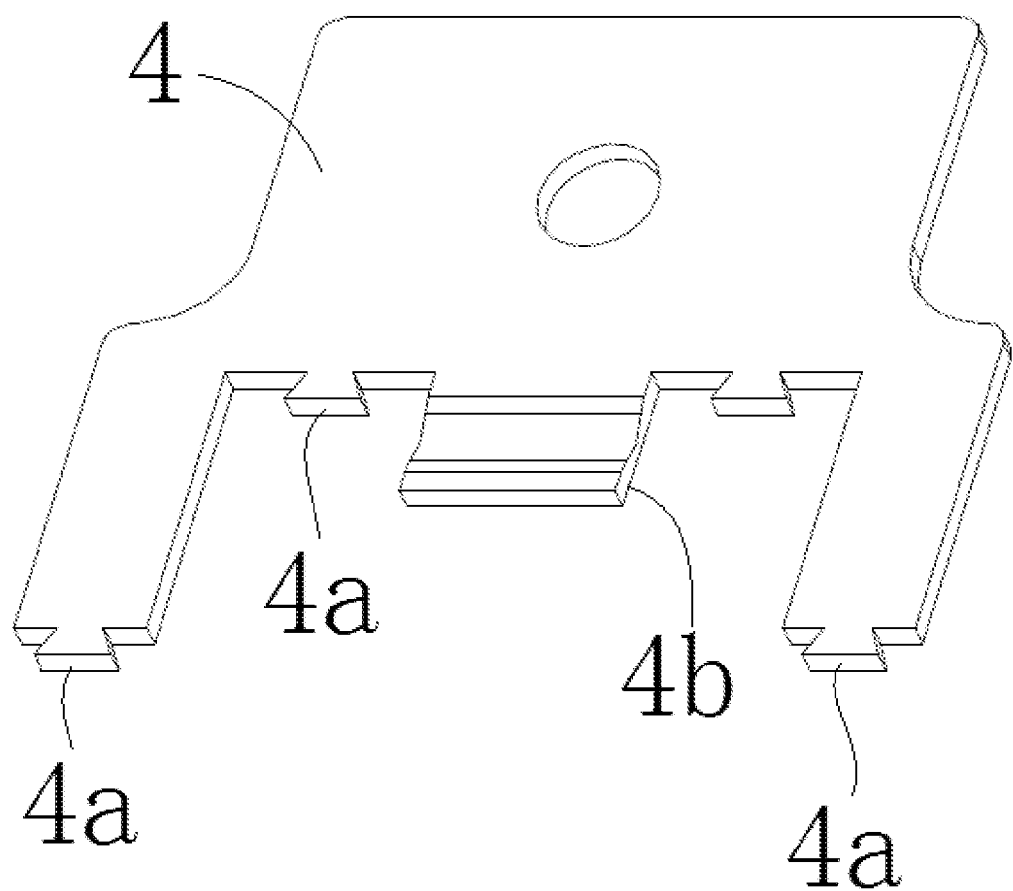
FIG. 4a shows an illustrative perspective view of a heat conduction plate of the battery pack temperature acquisition module shown in FIG. 4.
Figure 4B:
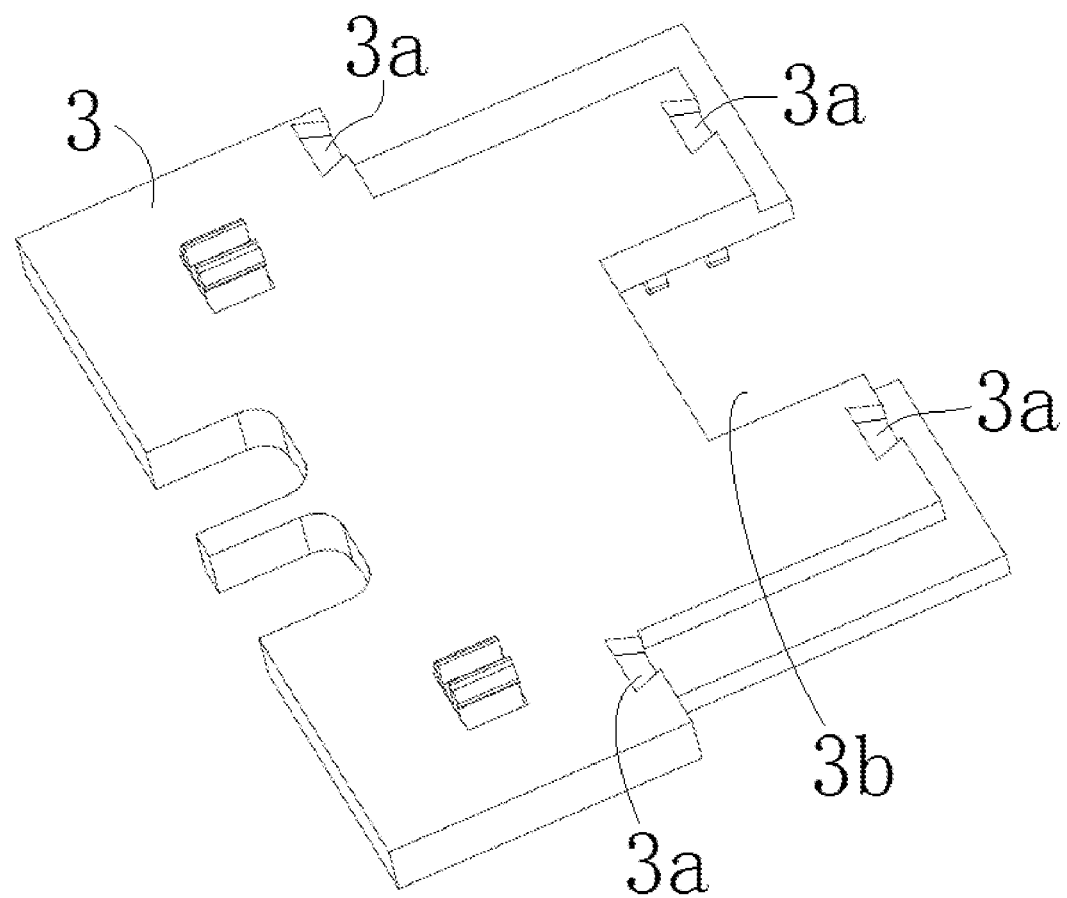
FIG. 4b shows an illustrative perspective view of an insulation body of the battery pack temperature acquisition module shown in FIG. 4.

FIG. 4 shows an illustrative perspective view of the battery pack temperature acquisition module 100 shown in FIG. 3 when viewed from the bottom; FIG. 4a shows an illustrative perspective view of the heat conduction plate 4 of the battery pack temperature acquisition module 100 shown in FIG. 4. FIG. 4b shows an illustrative perspective view of the insulation body 3 of the battery pack temperature acquisition module 100 shown in FIG. 4.

As shown in FIGS. 1 to 4, in an embodiment, the insulation body 3 is in a plate shape, and the heat conduction plate 4 is spliced and connected with the insulation body 3. As shown in FIG. 4, a plurality of dovetail protrusions 4a are formed on the heat conduction plate 4, and a plurality of dovetail grooves 3a are formed on the insulation body 3. The plurality of dovetail protrusions 4a are respectively engaged with the plurality of dovetail grooves 3a to splice the heat conduction plate 4 and the insulation body 3 together. A notch 3b is formed on the insulation body 3, the heat conduction plate 4 has a tongue portion 4b extending into the notch 3b, and the temperature sensing element 10 is accommodated in the notch 3b and thermally contacted or connected with the tongue portion 4b.

As shown in FIGS. 2 and 3, in an embodiment, the battery pack temperature acquisition module 100 also includes an insulation package 5 formed on the insulation body 3, and the temperature sensing element 10 is encapsulated in the insulation package 5, so that the temperature sensing element 10 can be protected. In addition, in the illustrated embodiment, an electrical connection part between the terminal 2 and the lead 11 is also encapsulated in the insulation package 5. In an exemplary embodiment of the invention, the temperature sensing element 10 may be a negative temperature coefficient (NTC) thermistor sensor, the insulation package 5 may be formed of epoxy resin. The insulation package 5 may be a low pressure injection molded part.

As shown in FIG. 4a, in the illustrated embodiment, the area of the heat conduction plate 4 to contact the temperature sensing element 10 is a concave area, for example, the concave area matches the shape of the temperature sensing element 10, which can increase the thermal contact area and heat transfer effect.

As shown in FIGS. 4 and 4b, in the illustrated embodiment, the welding surface of the heat conduction plate 4 and the back surface of the insulation body 3 are coplanar to reduce the thickness of the temperature acquisition module 100.

Figure 5:
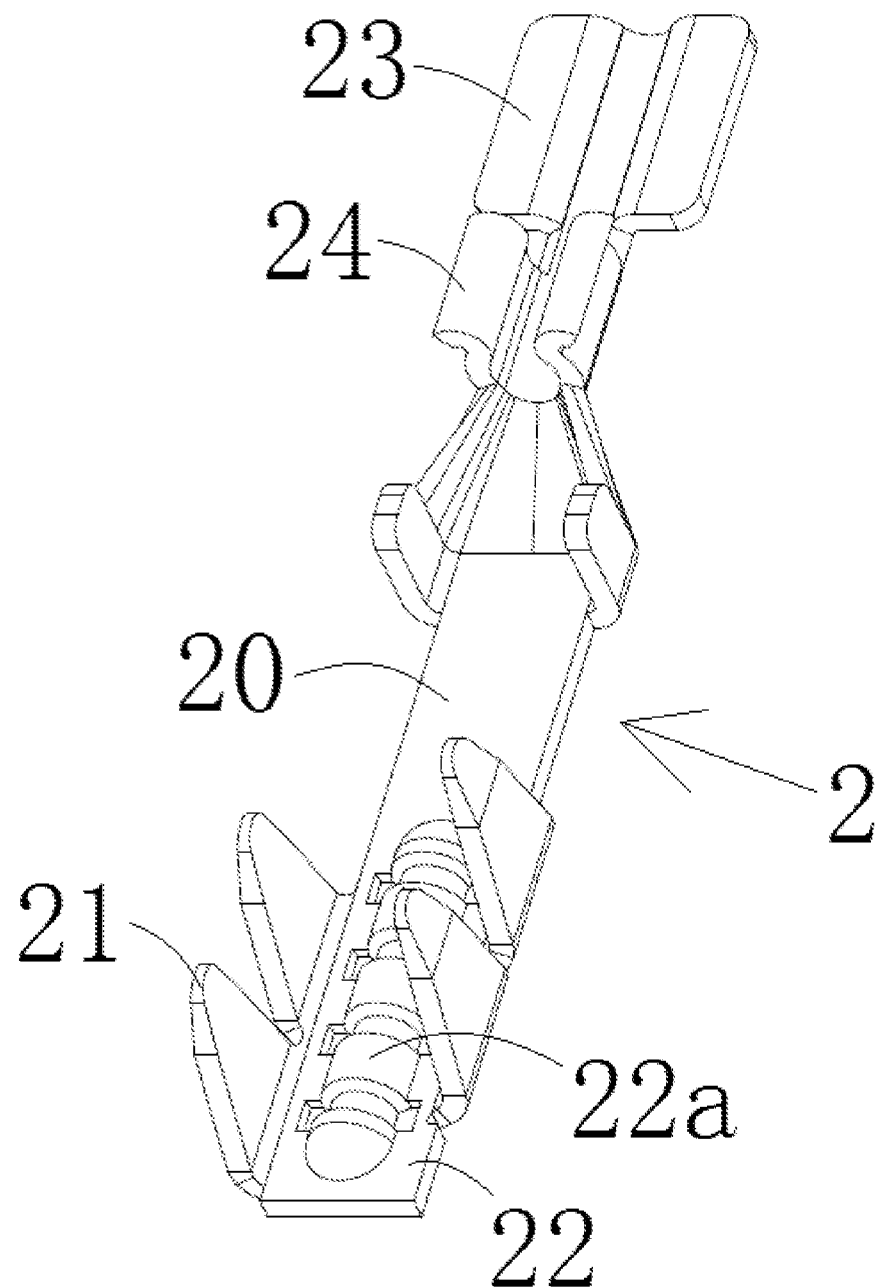
FIG. 5 shows an illustrative perspective view of a connection terminal in the battery pack temperature acquisition module shown in FIG. 3.

FIG. 5 shows an illustrative perspective view of the connection terminal 2 in the battery pack temperature acquisition module 100 shown in FIG. 3.

As shown in FIGS. 3 and 5, in an embodiment, the connection terminal 2 includes a main body 20 having opposite first and second ends. A plurality of wing parts 21 are respectively formed on both sides of the first end of the main body 20, and the wing part 21 is toothed and suitable for being crimped to the signal acquisition line 200 by puncture crimping. In order to facilitate puncture, the signal acquisition line 200 may be a flexible flat cable.

Note that the present invention is not limited to the illustrated embodiment. For example, the signal acquisition line 200 may also be a flexible printed circuit board, and the wing part 21 of the connection terminal 2 may be crimped to the flexible printed circuit board.

As shown in FIGS. 3 and 5, in an embodiment, the wing parts 21 on both sides of the main body 20 of the connection terminal 2 may be staggered by a certain distance in the extension direction of the main body 20 so that the wing parts 21 on both sides are staggered from each other after being crimped to the signal acquisition line 200.

As shown in FIGS. 3 and 5, in an embodiment, the first end of the main body 20 of the connection terminal 2 includes a plate-shaped base part 22, the wing parts 21 are respectively connected to both sides in the width direction of the plate-shaped base part 22. A protrusion 22*a* is formed on the plate-shaped base part 22, which can be formed by stamping. The signal acquisition line 200 is adapted to be crimped between the protrusion 22*a* and the wing part 21. In this way, the crimping effect and electrical contact performance of the connection terminal can be improved.

As shown in FIGS. 3 and 5, in an embodiment, a welding part 23 is formed at the second end of the main body 20 of the connection terminal 2, and the leads 11 of the temperature sensing element 10 are welded to the welding part 23. In the illustrated embodiment, a clamping part 24 is also formed at the second end of the main body 20 for pre clamping and fixing the leads 11 of the temperature sensing element 10 before welding the leads 11, so as to prevent the leads 11 from being moved during welding.

In the foregoing embodiment, the signal acquisition line 200 may be a signal acquisition bus or a flexible electrical connection line (or called a signal acquisition branch line) connected to the signal acquisition bus.

Figure 7A:
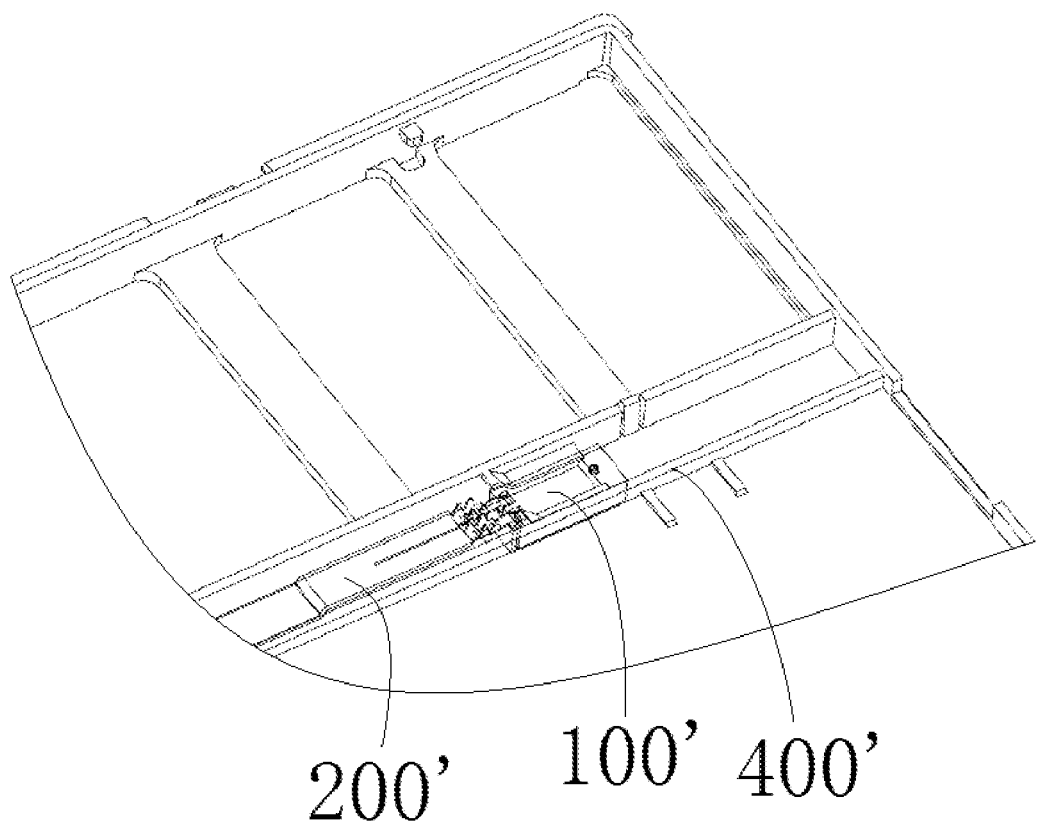
FIG. 7a shows an illustrative view of a battery pack temperature acquisition system according to another exemplary embodiment of the present invention.
Figure 7B:
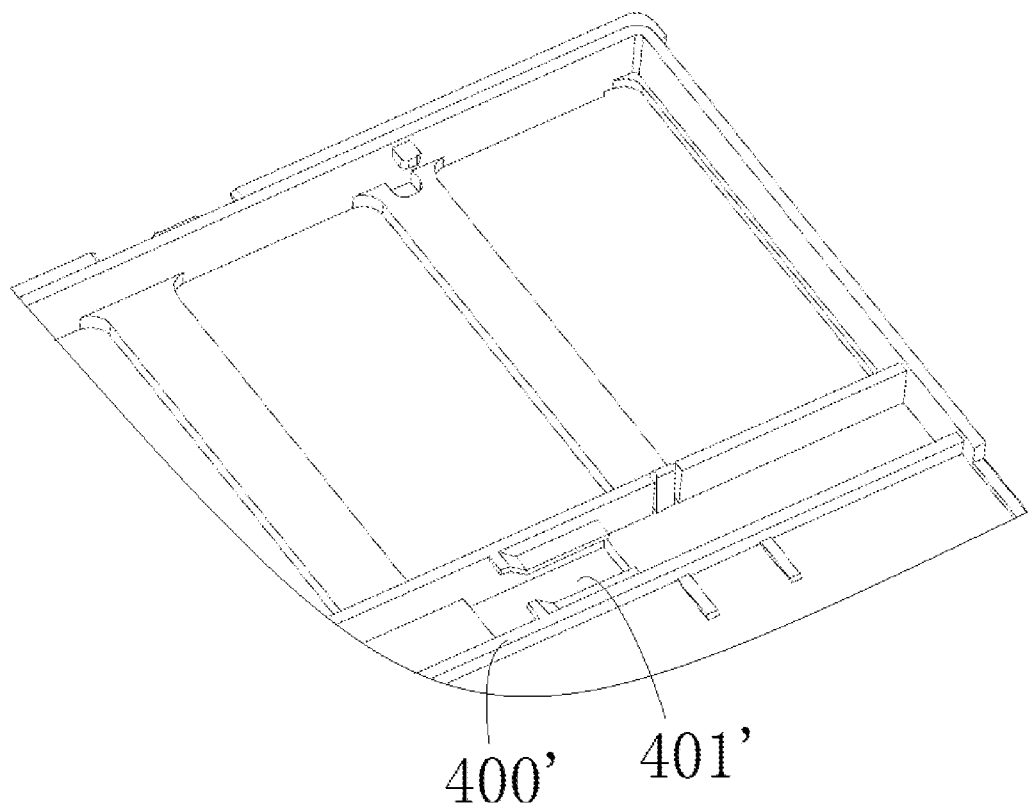
Figure 8:
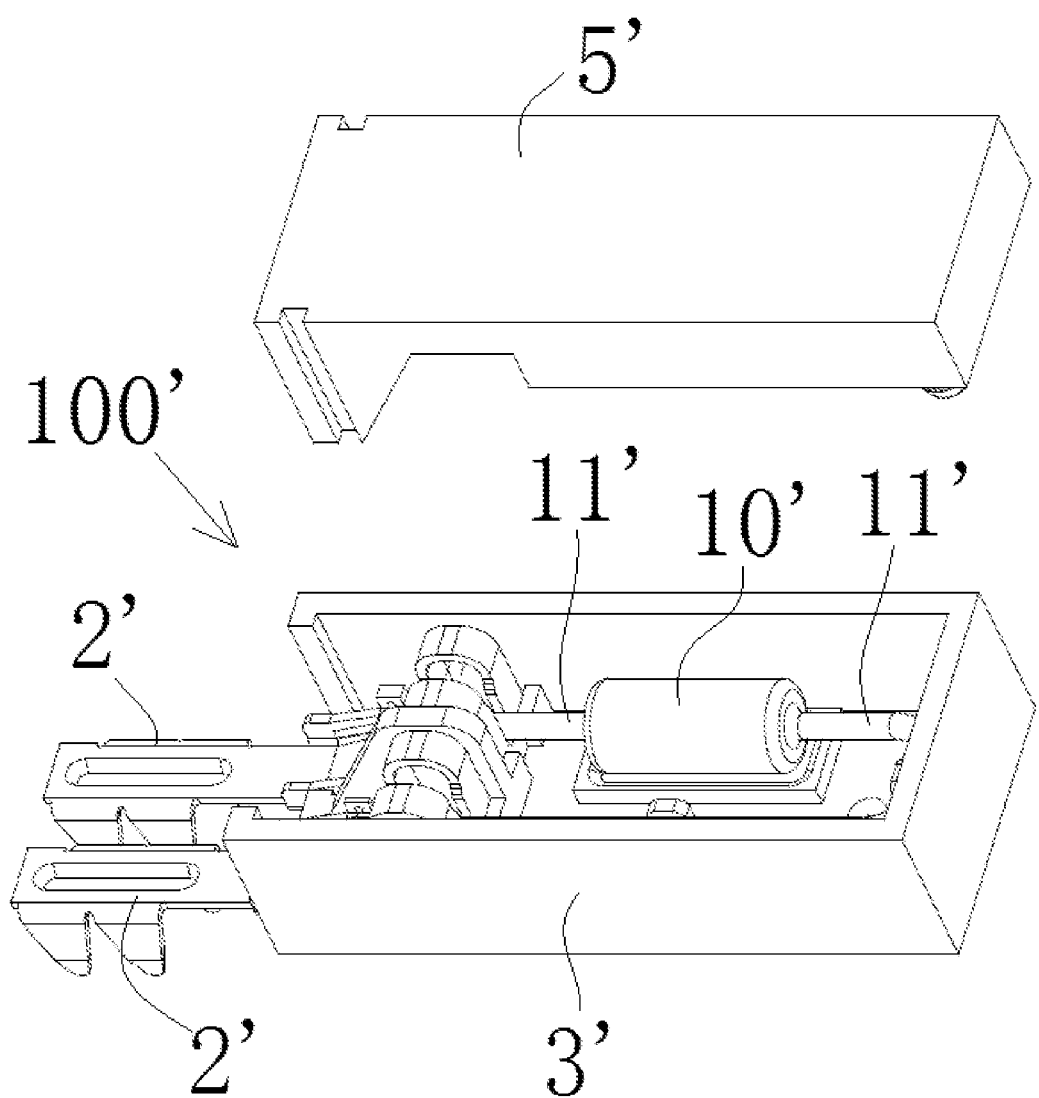
Figure 9:
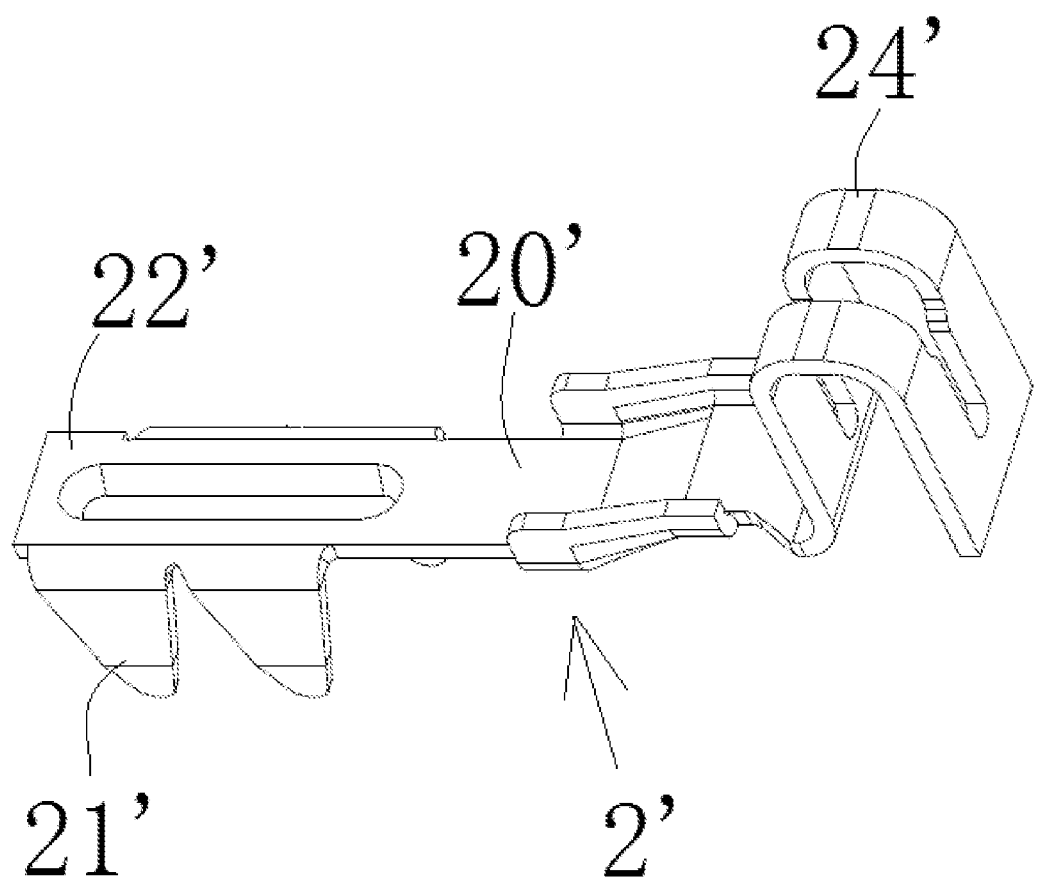
FIG. 9 shows an illustrative perspective view of a connection terminal of the battery pack temperature acquisition module shown in FIG. 8.

FIG. 7*a* shows an illustrative view of a battery pack temperature acquisition system according to another exemplary embodiment of the present invention. FIG. 7*b* shows an illustrative perspective view of a bracket shown in FIG. 7*a*. FIG. 8 shows an illustrative perspective view of a battery pack temperature acquisition module 100' in the battery pack temperature acquisition system shown in FIG. 7*a*. FIG. 9 shows an illustrative perspective view of a connection terminal 2' of the battery pack temperature acquisition module 100' shown in FIG. 8.

As shown in FIGS. 7 to 9, in an embodiment, the battery pack temperature acquisition system mainly includes a plurality of battery pack temperature acquisition modules 100' and a signal acquisition line 200'. The plurality of battery pack temperature acquisition modules 100' are used to detect the temperature of the battery pack respectively, and the plurality of battery pack temperature acquisition modules 100' are electrically connected to the signal acquisition line 200' respectively, so that the temperature signals detected by the battery pack temperature acquisition modules 100' can be collected through the signal acquisition line 200'.

As shown in FIGS. 7 to 9, in an embodiment, the battery pack temperature acquisition module 100' mainly includes an insulation body 3', a temperature sensing element 10' and two connection terminals 2'. The temperature sensing element 10' is mounted on the insulation body 3' to detect the temperature of the battery pack. The two connection terminals 2' are electrically connected with two leads 11' of the temperature sensing element 10' respectively.

As shown in FIGS. 7 to 9, in an embodiment, the insulation body 3' is in a box shape, and the temperature sensing element 10' is accommodated' in the box shaped insulation body 3'. The battery pack temperature acquisition module 100' is installed in a harness bracket 400' located on the top cover of the battery pack, and the signal acquisition line 200' is accommodated in the harness bracket 400'. The battery pack temperature acquisition module 100' and the signal acquisition line 200' are fixedly supported on the bracket 400'. The temperature sensing element 10' in the battery pack temperature acquisition module 100' can be in thermal contact or thermally connected with a battery cell of the battery pack. For example, it can be thermally connected with the battery cell through conductive adhesive to detect the temperature of the battery cell.

As shown in FIGS. 7 to 9, in an embodiment, the battery pack temperature acquisition module also includes a thermal conductive package 5'. The thermal conductive package 5' is provided in the box shaped insulation body 3', and encapsulates the temperature sensing element 10' in the box shaped insulation body 3'.

As shown in FIGS. 7 to 9, in an embodiment, the battery pack temperature acquisition system also includes a bus bar 300 (see FIG. 1). The bus bar 300 is fixedly supported on the bracket 400' and connected with the battery cell. The battery pack temperature acquisition module 100' is configured to sense the temperature of the bus bar 300 and transmit the temperature signal to the signal acquisition line 200'.

As shown in FIGS. 7 to 9, in an embodiment, the bracket 400' is formed with an installation opening 401', the battery pack temperature acquisition module 100' is installed in the installation opening 401'. The temperature sensing element 10' is in thermal contact or thermal connection with the battery cell.

As shown in FIGS. 7 to 9, in an embodiment, the connection terminal 2' includes a main body 20' having opposite first and second ends. A plurality of wing parts 21' are respectively formed on both sides of the first end of the main body 20', and the wing part 21' is toothed and suitable for being crimped to the signal acquisition line 200' by puncture crimping. In order to facilitate puncture, the signal acquisition line 200' may be a flexible flat cable.

As shown in FIGS. 7 to 9, in an embodiment, the wing parts 21' on both sides of the main body 20' of the connection terminal 2' may be staggered by a certain distance in the extension direction of the main body 20' so that the wing parts 21' on both sides are staggered from each other after being crimped to the signal acquisition line 200'.

As shown in FIGS. 7 to 9, in an embodiment, a clamping portion 24' is formed at the second end of the main body 20', the clamping portion 24' is interference matched with the lead 11' of the temperature sensing element 10' to realize electrical contact and fixed connection between them.

As shown in FIGS. 7 to 9, in an embodiment, the first end of the main body 20' of the connection terminal 2' includes a plate-shaped base part 22', the wing parts 21' are respectively connected to both sides in the width direction of the plate-shaped base part 22'. A protrusion may be formed on the plate-shaped base part 22', which can be formed by stamping. The signal acquisition line 200' is adapted to be crimped between the protrusion and the wing part 21'. In this way, the crimping effect and electrical contact performance of the connection terminal can be improved.

Figure 10:
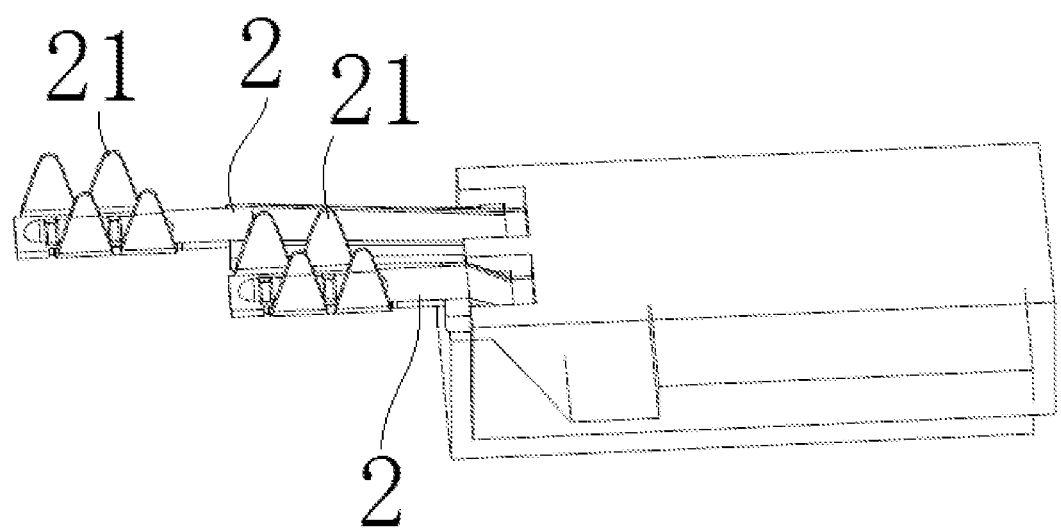
FIG. 10 shows an illustrative view of a battery pack temperature acquisition module according to another exemplary embodiment of the present invention.

FIG. 10 shows an illustrative view of a battery pack temperature acquisition module according to another exemplary embodiment of the present invention.

The difference between the battery pack temperature acquisition module shown in FIG. 10 and the battery pack temperature acquisition module shown in FIGS. 7 to 9 is that the extension lengths of the pair of connection terminals 2 are different. In the embodiment shown in FIGS. 7 to 9, the extension lengths of the pair of connection terminals 2 are basically the same. In the embodiment shown in FIG. 10, the extension lengths of the pair of connection terminals 2 are different.

As shown in FIG. 10, in the illustrated embodiment, the temperature sensing element 10 includes a pair of leads 11, which are electrically contacted and fixedly connected with the pair of connection terminals 2 respectively. The first end of each of the pair of connection terminals 2 is provided with a connection part (i.e., wing parts 21) electrically connected to the signal acquisition line 200. The connection parts of the pair of connecting terminals 2 are staggered by a predetermined distance in the extension direction of the main body 20 so that the connection parts of the pair of connecting terminals 2 are staggered from each other after being connected to the signal acquisition line 200. Except for the above differences, the other features of the battery pack temperature acquisition module shown in FIG. 10 are basically the same as those of the battery pack temperature acquisition module shown in FIGS. 7 to 9.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A battery pack temperature acquisition module, comprising:
   an insulation body;
   a temperature sensing element mounted on the insulation body and configured to detect a temperature of a battery cell;
   a connection terminal mounted on the insulation body; and
   an insulation package formed on the insulation body;
   wherein the temperature sensing element comprises a lead for transmitting a temperature signal, one end of the connection terminal is electrically connected with the lead of the temperature sensing element, and another end of the connection terminal is adapted to be connected to a signal acquisition line to electrically connect the temperature sensing element to the signal acquisition line;
   wherein the connection terminal and the insulation body are formed as two separate parts; and
   wherein the temperature sensing element is encapsulated in the insulation package.

2. The battery pack temperature acquisition module according to claim 1,
   wherein a plurality of clamping blocks are provided on the insulation body, and the clamping blocks protrude from a surface of the insulation body for mounting the temperature sensing element and the connection terminal respectively.

3. The battery pack temperature acquisition module according to claim 1,
   wherein an electrical connection part between the connection terminal and the lead is encapsulated in the insulation package.

4. The battery pack temperature acquisition module according to claim 1, wherein the insulation package is a low pressure injection molded part.

5. The battery pack temperature acquisition module according to claim 1,
   wherein the insulation body is in a box shape, and the temperature sensing element is accommodated and encapsulated in the box shaped insulation body.

6. The battery pack temperature acquisition module according to claim 5,
   wherein a thermal conductive package is provided in the box shaped insulation body, and the temperature sensing element is encapsulated in the box shaped insulation body by the thermal conductive package.

7. A battery pack temperature acquisition system, comprising:
   a bracket;
   the battery pack temperature acquisition module according to claim 1; and
   the signal acquisition line,
   wherein the battery pack temperature acquisition module and the signal acquisition line are fixedly supported on the bracket;
   wherein the connection terminal of the battery pack temperature acquisition module is connected to the signal acquisition line to electrically connect the temperature sensing element of the battery pack temperature acquisition module to the signal acquisition line.

8. The battery pack temperature acquisition system according to claim 7, further comprising:
   a bus bar fixedly supported on the bracket and connected with the battery cell;
   wherein the battery pack temperature acquisition module is configured to sense the temperature of the bus bar and transmit a temperature signal to the signal acquisition line.

9. The battery pack temperature acquisition system according to claim 7,
   wherein the bracket is formed with an installation opening, the battery pack temperature acquisition module is installed in the installation opening, and the temperature sensing element is in thermal contact or thermal connection with the battery cell.

10. A battery pack temperature acquisition module, comprising:
an insulation body;
a temperature sensing element mounted on the insulation body and configured to detect a temperature of a battery cell; and
a connection terminal mounted on the insulation body;
wherein the temperature sensing element comprises a lead for transmitting a temperature signal, one end of the connection terminal is electrically connected with the lead of the temperature sensing element, and another end of the connection terminal is adapted to be connected to a signal acquisition line to electrically connect the temperature sensing element to the signal acquisition line;
wherein the connection terminal and the insulation body are formed as two separate parts;
wherein the connection terminal comprises a main body, the main body having opposite first and second ends, the first end of the main body being used to connect to the signal acquisition line, and the second end of the main body being electrically connected with the lead of the temperature sensing element; and
wherein a plurality of wing parts are respectively formed from sides of the first end of the main body, and the wing parts are toothed and adapted to be crimped on the signal acquisition line by puncture crimping.

11. The battery pack temperature acquisition module according to claim 10,
wherein a clamping portion being formed at the second end of the main body, the clamping portion is interference matched with the lead of the temperature sensing element to realize electrical contact and fixed connection between them.

12. The battery pack temperature acquisition module according to claim 10,
wherein the temperature sensing element comprises a pair of the leads electrically contacting and fixedly connected with a pair of connection terminals respectively;
wherein the first end of each of the pair of connection terminals is provided with a connection part electrically connected with the signal acquisition line;
wherein the connection parts of the pair of connection terminals are staggered by a predetermined distance in an extension direction of the main body, so that the connection parts of the pair of connection terminals are staggered from each other after being connected to the signal acquisition line.

13. The battery pack temperature acquisition module according to claim 10,
wherein a welding part is formed at the second end of the main body, and the lead of the temperature sensing element is welded to the welding part.

14. The battery pack temperature acquisition module according to claim 13,
wherein a clamping part being formed at the second end of the main body, the clamping part is used to pre-clamp and fix the lead of the temperature sensing element before welding the lead.

15. A battery pack temperature acquisition module, comprising:
an insulation body;
a temperature sensing element mounted on the insulation body and configured to detect a temperature of a battery cell;
a connection terminal mounted on the insulation body; and
a heat conduction plate adapted to be welded on a bus bar of a battery pack;
wherein the temperature sensing element comprises a lead for transmitting a temperature signal, one end of the connection terminal is electrically connected with the lead of the temperature sensing element, and another end of the connection terminal is adapted to be connected to a signal acquisition line to electrically connect the temperature sensing element to the signal acquisition line;
wherein the connection terminal and the insulation body are formed as two separate parts; and
wherein the temperature sensing element is in thermal contact or thermal connection with the heat conduction plate to detect the temperature of the battery cell through the heat conduction plate.

16. The battery pack temperature acquisition module according to claim 15,
wherein an area of the heat conduction plate to contact the temperature sensing element is a concave area.

17. The battery pack temperature acquisition module according to claim 15,
wherein the insulation body is in a plate shape, and the heat conduction plate is spliced and connected with the insulation body.

18. The battery pack temperature acquisition module according to claim 15,
wherein a welding surface of the heat conduction plate and a back surface of the insulation body are coplanar to reduce the thickness of the battery pack temperature acquisition module.

* * * * *